US007002877B2

(12) United States Patent
Arvelo et al.

(10) Patent No.: US 7,002,877 B2
(45) Date of Patent: Feb. 21, 2006

(54) METHOD AND APPARATUS FOR ACTIVE SONAR PERFORMANCE PREDICTION

(75) Inventors: Juan I. Arvelo, Dayton, MD (US); Bruce Newhall, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 10/980,058

(22) Filed: Nov. 3, 2004

(65) Prior Publication Data

US 2005/0286345 A1    Dec. 29, 2005

Related U.S. Application Data

(60) Provisional application No. 60/516,897, filed on Nov. 3, 2003.

(51) Int. Cl.
*H04B 17/00* (2006.01)
(52) U.S. Cl. .......................................... 367/131; 367/13
(58) Field of Classification Search ................... 367/13, 367/131
See application file for complete search history.

(56) References Cited

U.S. PATENT DOCUMENTS

| | | | |
|---|---|---|---|
| 5,126,978 A * | 6/1992 | Chaum ........................ | 367/131 |
| 5,475,651 A | 12/1995 | Bishop et al. | |
| 5,568,450 A | 10/1996 | Grande et al. | |
| 5,608,689 A | 3/1997 | Capell, Sr. | |
| 5,774,562 A | 6/1998 | Furuya et al. | |
| 5,812,494 A | 9/1998 | Medeiros | |
| 5,844,951 A * | 12/1998 | Proakis et al. ............... | 375/347 |
| 5,913,179 A | 6/1999 | Sutton et al. | |
| 6,002,914 A | 12/1999 | Weinberg | |
| 6,005,916 A | 12/1999 | Johnson et al. | |
| 6,044,336 A | 3/2000 | Marmarelis et al. | |
| 6,424,920 B1 | 7/2002 | Osypov | |
| 6,449,215 B1 | 9/2002 | Shell | |
| 6,575,043 B1 | 6/2003 | Huang et al. | |
| 6,721,694 B1 | 4/2004 | Lambrecht et al. | |
| 6,771,561 B1 | 8/2004 | Bouyoucos et al. | |
| 2004/0125700 A1 | 7/2004 | Bouyoucos et al. | |

FOREIGN PATENT DOCUMENTS

WO    WO2005/015369 A2 *    2/2005

* cited by examiner

*Primary Examiner*—Ian J. Lobo
(74) *Attorney, Agent, or Firm*—Benjamin Y. Roca

(57) ABSTRACT

A system and method for predicting active, low-frequency sonar array performance in shallow, littoral waters using a physics-based modeling of acoustic reverberation. An operator characterizes the active sonar's acoustic transmitter and receiver, the environment it is operating in and the targets to be detected. The operator selects appropriate bathymetry, bottom composition and sound-speed profile. The spatial resolution of the bathymetry database is enhanced using fractal interpolation and a bottom-loss-and-scattering corrected-for-slope is calculated. A semi-empirical scattering strength is derived from a wind-speed data base and a stochastic biologic realization is derived from a biologic population database. These are then used to calculate a deterministic component of bottom, surface and volume reverberation using a normal mode mathematical model of acoustic wave propagation. A stochastic realization of clutter is calculated using a Generalized Gamma distribution database, and combined with the deterministic components of reverberation.

20 Claims, 3 Drawing Sheets

METHOD AND APPARATUS FOR ACTIVE SONAR PERFORMANCE PREDICTION

CROSS-REFERENCE TO RELATED APPLICATIONS

This application claims the benefit of prior filed co-pending U.S. application No. 60/516,897, filed on Nov. 3, 2003, the entire contents of which are hereby incorporated by reference.

BACKGROUND OF THE INVENTION

1. Field of the Invention

The present invention relates generally to the field of predicting sonar performance, and more particularly to systems and methods of predicting the performance of active sonar arrays in the open ocean and in shallow water coastal sites.

2. Description of the Related Art

Sonar, a well known technology in which sound waves are used for detecting objects, has found extensive application in maritime environments. Sonar systems can be broadly divided into two types: active sonar and passive sonar. An active sonar system includes a sound source, which emits bursts of sound, and an array of receivers which listen for the reflection of the emitted sound from an object. A passive sonar system has no sound source and relies on its array of receivers to detect sound emitted by the object being sought. A passive sonar system can operate covertly but can only detect objects emitting sounds louder than the ambient noise of the environment.

Throughout the cold war, a major objective of US Naval sonar was to conduct long range, deep ocean surveillance of relatively noisy nuclear submarines, a mission suited to passive sonar systems. The end of the cold war has lead to an increased need for addressing so called Third World scenarios. These scenarios include detecting quiet diesel-electric submarines running on batteries in shallow water at much shorter ranges, typically of the order of 1 to 50 miles.

Although they do not operate covertly like passive sonar, active sonars have the advantage of providing their own energy for illuminating quiet targets. Active sonars, however, not only have to contend with the ambient noise of wind, wave action and shipping but also with non-target echoes of their own transmitted signal from the rough ocean surface, bottom boundaries and fish or other biologics present in the water column. These sources of noise related to the transmitted signal are referred to as surface, bottom and volume reverberation, and the target like contributions are commonly called clutter. In littoral waters, the scattering off the ocean floor dominates the reverberant field, while scattering off the sea-surface dominates under high sea-state conditions, and volume reverberation dominates at high-frequencies and at sites with a high fish-population density.

When operating an active sonar system to detect submerged targets in shallow, littoral waters, the sonar display may be dominated by target-like clutter caused by the complicated acoustic wave-guide conditions of the local bathometry. The sonar operator has to learn to distinguish a real target echo from the clutter caused by reverberation. A system for simulating the performance of an active sonar system therefore has to account for the reverberation.

Each component of the reverberant field has a level of stochastic clutter, i.e., back-scattering that is essentially randomly distributed, and a level of deterministic clutter, i.e., clutter that is due to specific structure within the bathymetry and is typically isotropic. Clutter from surface and volume reverberation tends to be predominantly stochastic due to the dynamic nature of the water column and atmospheric conditions. Bottom reverberation, however, tends to be dominated by the deterministic clutter because of the relatively static nature of the sea-floor. Existing methods for simulating reverberation in multi-path sonar such as, but not limited to, the system described in U.S. Pat. No. 6,002, 914 issued to Weinberg on Dec. 14$^{th}$, 1999 entitled "Method and Apparatus for Simulating Reverberation in a Multi-path Sonar System", the contents of which are hereby incorporated by reference, utilize stochastic methods to simulate reverberation. They work well with surface, volume and deep water reverberation, but do not provide a good simulation of the scattering off the ocean floor that dominates the reverberation field in literal waters because they do not model the deterministic component of the scattering.

SUMMARY OF THE INVENTION

The present invention is a system and method for predicting how an active, low-frequency sonar array will perform at any underwater location in the world, including shallow coastal waters. In particular, the present invention related to a physics-based modeling of acoustic reverberation for a low-frequency, active sonar operating in shallow, littoral waters. In a preferred embodiment, the present invention is implemented as a software package running on a computer. Using the software, an operator may select an arbitrary geographical location, specify details of an active sonar system's acoustic transmitter and acoustic receiver and define a target to be detected. The operator may also specify or select appropriate bathymetry, bottom composition and sound-speed profile databases for the chosen geographical location. Using these, a bottom-loss-and-scattering corrected-for-slope may be calculated. These in turn are used to calculate a deterministic component of surface reverberation by, for instance, modeling an acoustic signal propagating as a wave from the acoustic transmitter to said acoustic receiver using a normal mode mathematical model.

In a further embodiment, the spatial resolution of the bathymetry database may be enhanced using fractal interpolation. This enhanced bathymetry may then be characterized in terms of surface-roughness wave-numbers, so that a deterministic component of surface reverberation can be calculated using Bragg refraction.

In a further embodiment, a deterministic component of surface reverberation may be calculated using a semi-empirical scattering strength derived from a wind-speed data base, and a deterministic component of volume reverberation may be calculated from a stochastic biologic realization, derived from a biologic population database.

In a further embodiment, a stochastic realization of clutter may be calculated using a Generalized Gamma distribution database.

These and further details and advantages of the present invention will be described in the detailed description below.

DETAILED DESCRIPTION

The present invention is a system and method for simulating the performance of sonar arrays and, in particular, for simulating the performance of low-frequency (<1 kHz), active sonar systems. In this acoustic frequency range, wave based models provide a more accurate simulation, particularly of the clutter and reverberation.

In a preferred embodiment of the invention, it is implemented as a software package running on a computer. A user interacts with this software package which allows them to characterize the sonar transmitter and receiver, the operational environment and the targets being sought. This may include, but is not limited to, the necessary bathymetry, sound-speed profiles, bottom composition and wind-speed.

In a preferred embodiment, the software system of this invention processes this data using a normal modes approach, which is a well-known method of calculating the propagation of acoustic waves. The normal modes are solutions to the wave equation in model form. The wave equation in cylindrical co-ordinates can be written:

$$\frac{1}{r}\frac{\partial}{\partial r}\left(r\frac{\partial p}{\partial r}\right) + \rho(z)\frac{\partial}{\partial z}\left(\frac{1}{\rho(z)}\frac{\partial p}{\partial z}\right) + \frac{\omega^2}{c^2(z)}p = -\frac{\delta(r)\delta(z-z_s)}{2\pi r}$$

where p is the acoustic pressure field, r is range from the source, z is the receiver depth, $z_s$ is the source depth, $\rho(z)$ is the water density as a function of depth. With suitable substitutions, this can be rewritten as the modal equation:

$$\rho(z)\frac{d}{dz}\left[\frac{1}{\rho(z)}\frac{d\Psi_m(z)}{dz}\right] + \left[\frac{\omega^2}{c^2(z)} - k_{rm}^2\right]\Psi_m(z) = 0$$

where $\psi$, is the modal eigenfunction, m is the mode number and $k_{rm}$ is the modal eigenvalue. With appropriate boundary conditions, i.e.:

$$\Psi(0) = 0, \left.\frac{d\Psi}{dz}\right|_{z=D} = 0$$

solutions to the modal equation take the form of a sum over the normal modes:

$$p(r, z) = \frac{i}{4\rho(z_s)}\sum_{m=1}^{\infty}\Psi_m(z_s)\Psi_m(z)H_0^{(1)}(k_{rm}r)$$

where H is the Hankel function of zeroth order of the first kind, i.e., a sum of real and imaginary Bessel functions.

Using this normal-mode approach to calculating acoustic wave propagation has the advantage of optimizing the speed at which the computations can be done. This optimization is possible because, for instance, the normal modes for a given environment may be pre-computing and stored for later retrieval.

An exemplarily embodiment of the invention will now be described in more detail by reference to the attached diagrams, in which like numbers refer to like elements.

Figure 1:
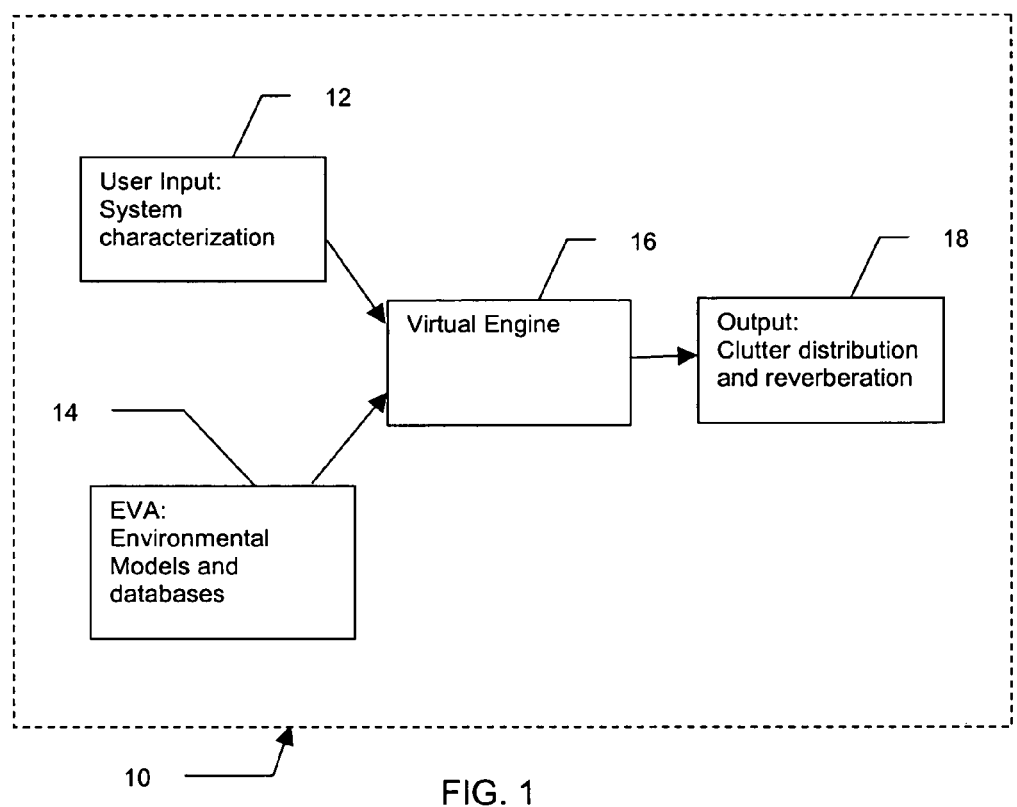
FIG. 1 is a schematic overview of a representative embodiment of the present invention.

FIG. 1 is a schematic overview of a representative embodiment of the present invention. The system 10 for predicting the clutter and reverberation components of an active sonar systems's performance comprises a user input module 12, an EVA Input module 14, a virtual engine module 16 and an output module 18.

In a preferred embodiment, the user input module 12 may be used to enter all aspects of the system characterization. The user input may include sonar system location and movement parameters, operating depth and standard sonar equation metrics for both mono-static and bistatic scenarios. Location and movement parameters typically include latitude and longitude of both sonar source and receiver. The sonar equation metrics typically include parameters such as, but not limited to: the source level (SL) or amount of power radiated by the sonar's own projector; the frequency, shape and duration of the acoustic signal; the directivity index (DI), or amount of noise reduction the sonar detector array is capable of; and the detection threshold (DT) or required signal-to-noise ratio in decibels to realize a specified probability of detection. The primary target may be specified at a similar level of detail, including, but not limited to a target course, speed, depth and target strength (TS), typically specified as a function of target aspect.

In a preferred embodiment, the EVA Input module 14 is a collection of databases and models. The database may include date-sensitive measurements or calculations of sound-velocity profiles (SVP), bathymetry databases, bottom loss databases and biological databases.

A preferred database for sound speed profiles is the Generalized Digital Environmental Database (GDEM). The GDEM database is available through the "Oceanic and Atmospheric Master Library Summary", Navel Oceanographic Office, Systems Integration Division, Stennis Space Center, MS 39522-5001 (October 2002).

A preferred bathymetric database is the high resolution portion of the Digital Bathymetric Data Base Variable resolution (DBDBV) database as described in, for instance, the "Oceanographic and Atmospheric Master Library Summary" (U), Naval Oceanographic Office report OAML-SUM-21J, October 2001, Section 3.7.

The virtual engine module 16 is a computing platform that uses the system characterization, environmental models and databases to calculate a clutter distribution and reverberation for a specified system at a specific location. In a preferred embodiment, the virtual engine module 16 may be one or more standard or customized computing modules, such as, but not limited to suitably customized MATLAB® mathematical processing modules supplied by The Mathworks, Inc, Natick, Mass. 01760-2098, USA. These modules may, for instance, be customized to implement the well-known normal-mode approach to acoustic wave propagation, as outlined above.

The output module 18 may deliver or display the results of the wave-propagation calculations as clutter distribution and reverberation for the required sonar scenario.

Figure 2:
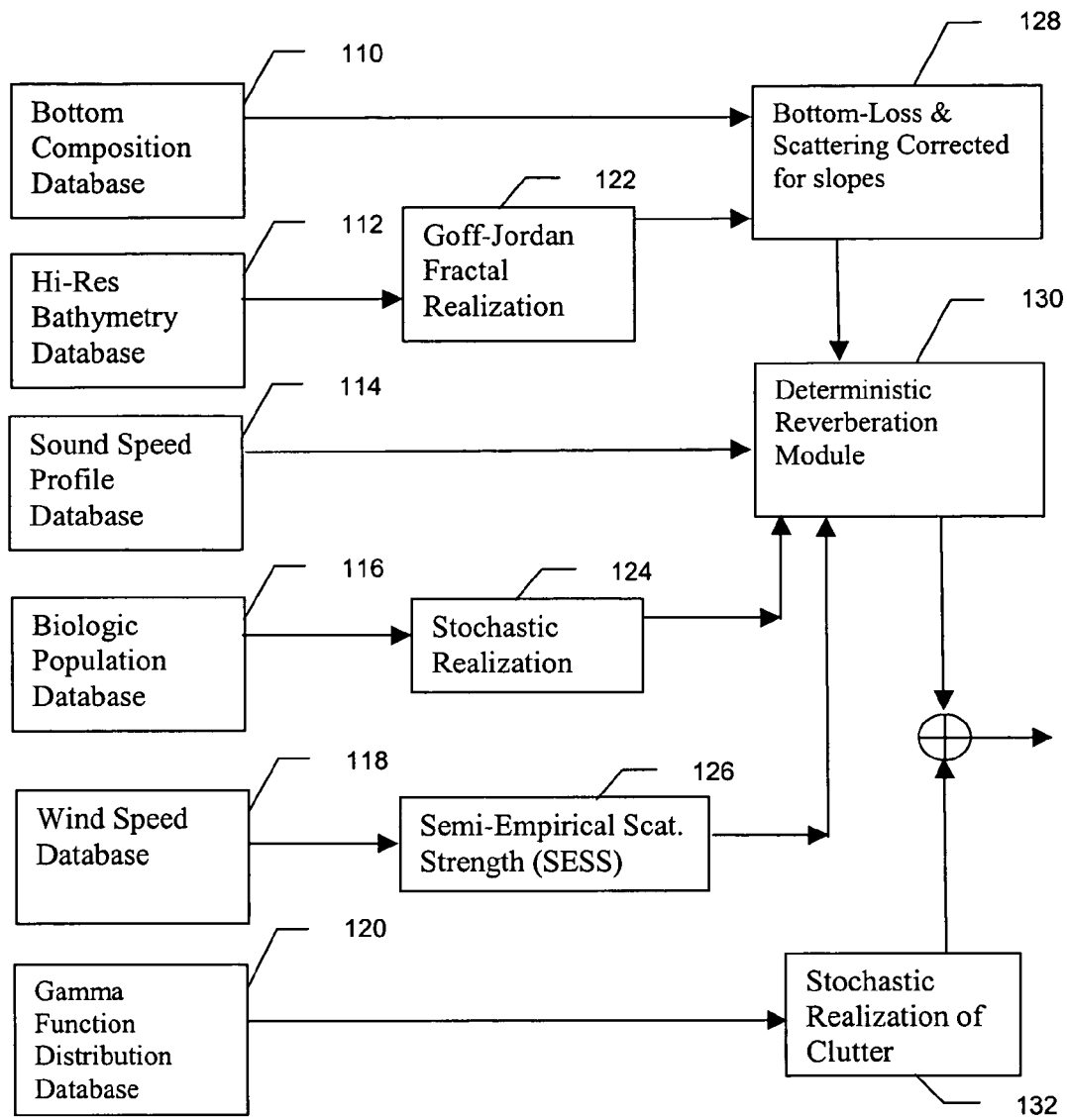
FIG. 2 is a schematic view showing the interaction of the databases the realization and the reverberation module in a preferred embodiment of the invention.

FIG. 2 is a schematic view showing the interaction of the databases, the realization modules and the reverberation module in a preferred embodiment of the invention. In a preferred embodiment, the data bases include a bottom composition database 110, a hi-resolution bathymetry data base 112, a sound-speed profile database 114, a biologic population data base 116, a wind-speed database 118, and a Generalized Gamma distribution parameter database 120.

Using the bottom composition database 110, the hi-resolution bathymetry data base 112, a bottom-loss-and-scattering corrected-for-slope may be calculated. This is a representation of the parameters necessary to calculate wave interaction with the ocean floor, which may be three dimensional. These parameters along with appropriate data from the sound-speed-profile database 114 are then used to calculate a deterministic component of surface reverberation by, for instance, modeling an acoustic wave propagating from the acoustic transmitter to said acoustic receiver using a normal mode mathematical model.

If a target is included, the calculation models wave propagation from the acoustic transmitter back to the acoustic receiver using a target strength model. The target strength model for a submarine is typically a complicated function of frequency, aspect and the design parameters of a particular hull. Target strength models can be calculated using standard mathematical techniques as detailed in, for instance, Kerr's "Propagation of Short Radio Waves" in MIT Radiation Laboratory Series, Vol. 13, McGraw-Hill, New York, pp. 445–469, 1951, the contents of which are hereby incorporated by reference.

In a further preferred embodiment, the spatial resolution of the bathymetry database may be enhanced using fractal interpolation. This enhanced bathymetry may then be characterized in terms of surface-roughness wave-numbers, so that a deterministic component of surface reverberation can be calculated using Bragg refraction.

The bottom-loss-and-scattering corrected-for-slopes module 138 accounts for the cumulative effects of the micro-roughness across the ocean floor at about the acoustic wavelength of interest. This is done using the bottom composition database 110 and the high resolution bathymetry database 112 related to the selected location of sonar acoustic source, target and sonar receiver. Because most high resolution bathymetry does not have sufficient resolution, one method of generating bathymetry data to the required resolution is the fractal approach provided by Goff-Jordan in "Stochastic Modeling of Seafloor Morphology: Inversion of Seam Beam Data for Second-Order Statistics" in the Journal of Geophysical Research, vol. 93, pp 13589–13608, published by the American Geophysical Union, Washington, D.C., the contents of which are hereby incorporated by reference. The Goff-Jordan Fractal Realization module 122 enhances the resolution of the High resolution bathymetry database 112 to generate realizations of the bathymetry at resolutions suited to the sonar wavelengths being simulated. The bottom-loss and scattering corrected for slopes module 128 may, for instance characterize the bathymetry obtained via the Goff-Jordan Fractal Realization module 122 at the Bragg wave-number matched to the acoustic wavelengths of the sonar acoustic source. Rough interface scattering is generally dominated by the Bragg condition, i.e., most scattering occurs from the surface roughness wave-numbers that are matched to the difference in acoustic incident and reflected wave-numbers. Having the bathymetry characterized by wave-number allows the deterministic reverberation module 130 to calculate a deterministic component of bottom reverberation.

The biologic population database 116 may be used by the stochastic realization module 124 to provide statistical models of biological populations in the selected ocean volume. A deterministic component of volume reverberation may then be calculated from this stochastic biologic realization by the deterministic reverberation module 130.

The wind-speed database 118 may be used by the semi-empirical scattering strength module 126 to calculate a semi-empirical scattering strength. A deterministic component of surface reverberation may then calculated by the deterministic reverberation module 130.

In a further preferred embodiment, a stochastic realization of clutter may be calculated using a database such as a K-distribution database or a Generalized Gamma distribution database 120. The Generalized Gamma distribution has the form:

$$f(x) = \frac{|c|}{x}\left(\frac{x}{\beta}\right)^{\alpha c} \exp[-(x/\beta)^c]/\Gamma(\alpha)$$

and has been shown to be a relatively good fit to experimental data relating the probability of false alarms to the strength of the returned signal. The Generalized Gamma distribution parameter database 120 supplies the parameters alpha, beta and c that provide the best fit of the Generalized Gamma distribution to experimental data from the selected bathymetry or to bathymetry that is analogous to the selected bathometry. In this embodiment, f(x) represents a probability of a false alarm, x represents a strength of the return signal relative to the active sonar's detection threshold, alpha, beta and c are numeric constants and $\Gamma(\alpha)$ is the Gamma function, which is related to the factorial function by $\Gamma(\alpha)=(\alpha-1)!$.

The stochastic realization of clutter module 132 is a module that uses the Generalized Gamma distribution parameter database 120 to provide a stochastic simulation of clutter.

Figure 3:
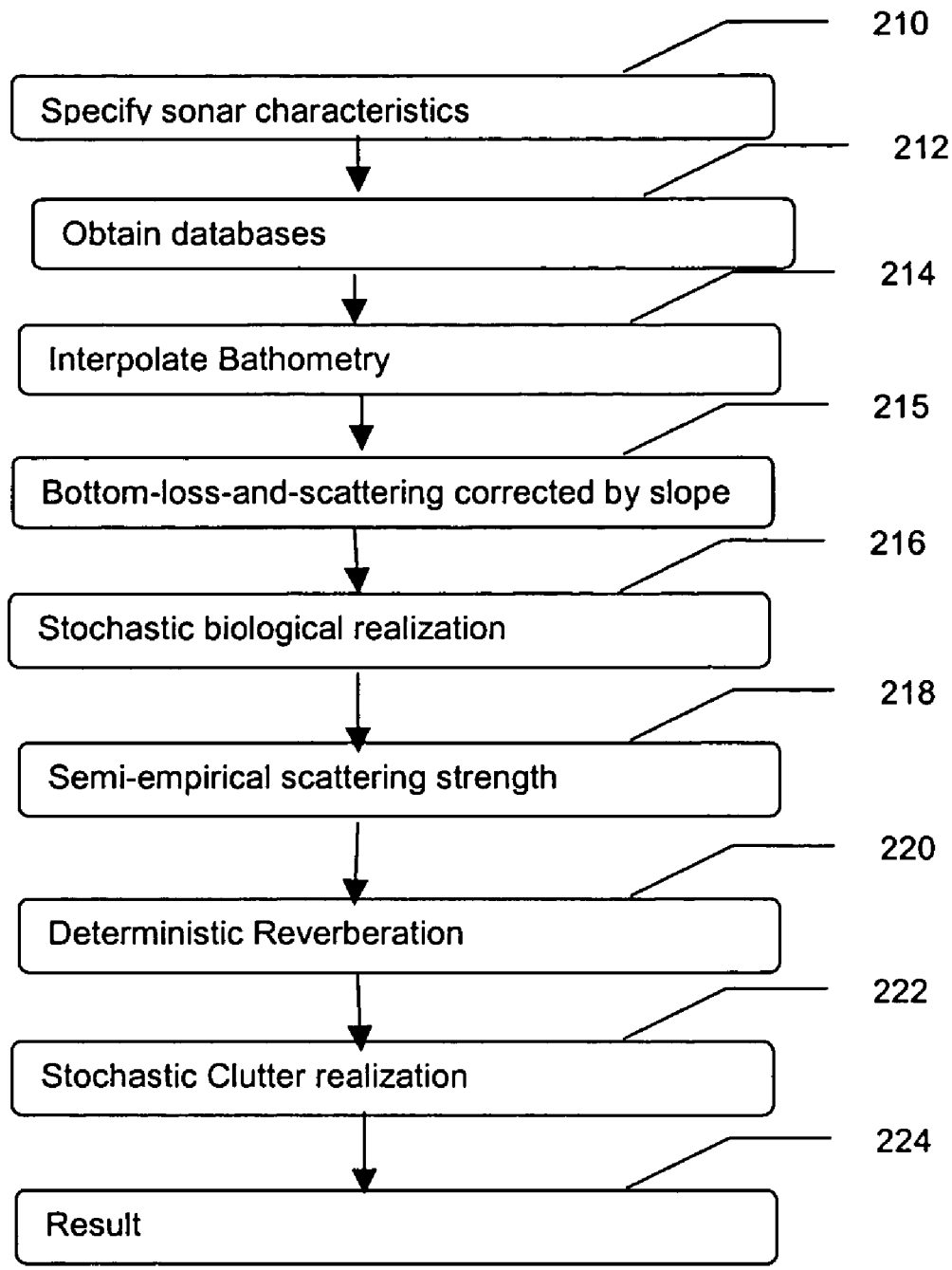
FIG. 3 is a flow diagram illustrating the method of the present invention.

FIG. 3 is a flow diagram showing an exemplary method of a preferred embodiment of the invention. The simulation of the sonar system performance begins at step 210 in which the user specifies the sonar characteristics, as detailed above.

In step 212, appropriate data bases are obtained including, but not limited to, obtaining the bottom composition database 110, the hi-resolution bathymetry data base 112, the sound-speed profile database 114, the biologic population data base 116, the wind-speed database 118, and the Generalized Gamma distribution parameter database 120.

In step 214, the high-resolution database is interpolated, using for instance fractal interpolation, as described in detail above, to provide an interpolated high resolution bathymetry. The interpolation may be necessary to simulate surface micro-roughness at a sufficiently fine scale for the sonar wavelengths being used.

In step 215, the bottom-loss-and-scattering corrected-for-slopes module uses the hi-resolution bathymetry data base 112, or the interpolated high resolution bathymetry derived from it, and the bottom composition database 110 to provide a bottom-loss-and-scattering corrected-for-slopes, which is a representation of the parameters necessary to calculate wave interaction with the ocean floor, which may be three dimensional.

In step 216, a stochastic biological realization is produced from the biological database. This may be done by, for instance, using a statistical algorithm base on biological database/literature review information. This process may be controlled by a rule-based system of placement using attraction/aversion rules. For example, biological clutter such as fish schools or whales may be placed automatically by using delimiting depth contours or thermal discontinuities. In a similar fashion, geological clutter may be created. In that instance, bottom slope parameters may serve as attractant for such clutter.

In step 218, the wind-speed database 118 may be used by the semi-empirical scattering strength module 126 to calculate a semi-empirical scattering strength.

In step 220, the deterministic reverberation module 130 uses the sound speed profile database 114, the bottom-loss-and-scattering corrected-for-slopes, the stochastic biological realization and the semi-empirical scattering strength to calculate deterministic components of the bottom, volume and surface reverberation for the specified active sonar operating in the selected location. In a preferred embodiment, this calculation is achieved using the well-known normal mode method of modeling acoustic wave propagation.

In step 222, the Generalized Gamma distribution database is used by the Stochastic Realization of clutter module 132 to provide a stochastic realization of clutter for the specified active sonar operating in the selected location. The Generalized Gamma distribution parameter database 120 supplies the parameters alpha and lambda that provide the best fit of the Generalized Gamma distribution to experimental data from the selected bathymetry or to bathymetry that is analogous to the selected bathymetry, thereby allowing the Stochastic Realization of clutter module 132 to provide a stochastic component of reverberation of clutter.

In step 224, the bottom, volume and surface reverberation and stochastic component of reverberation of clutter for the specified active sonar operating in the selected location are provided to the user. This may, for instance, take the form of a clutter map.

The above-described steps can be implemented using standard well-known programming techniques. The novelty of the above-described embodiment lies not in the specific programming techniques but in the use of the steps described to achieve the described results. Software programming code which embodies the present invention is typically stored in permanent storage of some type, such as permanent storage of a workstation located at JHU/APL. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

It will be understood that each element of the illustrations, and combinations of elements in the illustrations, can be implemented by general and/or special purpose hardware-based systems that perform the specified functions or steps, or by combinations of general and/or special-purpose hardware and computer instructions.

These program instructions may be provided to a processor to produce a machine, such that the instructions that execute on the processor create means for implementing the functions specified in the illustrations. The computer program instructions may be executed by a processor to cause a series of operational steps to be performed by the processor to produce a computer-implemented process such that the instructions that execute on the processor provide steps for implementing the functions specified in the illustrations. Accordingly, the figures support combinations of means for performing the specified functions, combinations of steps for performing the specified functions, and program instruction means for performing the specified functions.

While the invention has been disclosed in terms of an exemplary embodiment, it will be apparent to one of ordinary skill in the art that many modifications can be made to the disclosed method and apparatus without departing from the spirit of the invention. Therefore, it is the intent of the appended claims to cover all such variations and modifications as come within the true spirit and scope of this invention.

What is claimed:

1. A method of predicting an active sonar array's performance, comprising the steps of:
    specifying an acoustic transmitter and an acoustic receiver of said active sonar array;
    selecting a geographical location;
    obtaining a bathymetry, database a bottom composition database and a sound speed profile database for said selected geographical location;
    calculating a bottom-loss-and-scattering corrected-for-slope for said geographical location using said bottom composition database and said bathymetry database; and
    calculating a deterministic component of surface reverberation using said bottom-loss-and-scattering corrected-for-slope and said sound speed profile database by modeling an acoustic signal propagating from said acoustic transmitter to said acoustic receiver using a normal mode model.

2. The method of claim 1 wherein said step of calculating a deterministic component of surface reverberation further comprises modeling an acoustic signal propagating from said acoustic transmitter to said acoustic receiver using a normal mode model.

3. The method of claim 2 further comprising the steps of enhancing the spatial resolution of said bathymetry using fractal interpolation to provide an enhanced bathymetry; and wherein said step of calculating a bottom-loss-and-scattering corrected-for-slope further comprises using said enhanced bathymetry.

4. The method of claim 3 further including the step of characterizing said enhanced bathymetry to produce surface-roughness wave-numbers, and wherein said step of calculating a deterministic component of surface reverberation further comprises using said surface roughness wave-numbers.

5. The method of claim 4 further comprising the steps of obtaining a wind-speed data base; obtaining a semi-empirical scattering strength from said wind-speed data base; and calculating a deterministic component of surface reverberation using said semi-empirical scattering strength.

6. The method of claim 5 further comprising the steps of obtaining a biologic population database; using said biologic population database to provide a stochastic biologic realization; and calculating a deterministic component of volume reverberation using said stochastic biologic realization.

7. The method of claim 1 further comprising the steps of obtaining a Generalized Gamma distribution database, and calculating a stochastic realization of clutter using said Generalized Gamma distribution database.

8. The method of claim 7 wherein said Generalized Gamma distribution database comprises parameters alpha, beta and c that provide a best fit of equation:

$$f(x) = \frac{|c|}{x}\left(\frac{x}{\beta}\right)^{\alpha c} \exp[-(x/\beta)^c]/\Gamma(\alpha)$$

to experimental data from said selected bathymetry or to a bathymetry analogous to said selected bathymetry, where f(x) represents a probability of a false alarm, x represents a strength of a return signal relative to a detection threshold of said active sonar, alpha, beta and c are numeric constants and $\Gamma(\alpha)$ is the Gamma function which is related to the factorial function by $\Gamma(\alpha)=(\alpha-1)!$.

9. The method of claim 7 wherein said step of calculating a stochastic realization of clutter further comprises modeling an acoustic signal propagating from said acoustic transmitter to said acoustic receiver using a normal mode model.

10. The method of claim 1 in which said active sonar array is responsive to frequencies in the range of 1 to 40 kHz.

11. An apparatus for predicting an active sonar array's performance, comprising:
a computer configured to be capable of:
specifying an acoustic transmitter and an acoustic receiver of said active sonar array;
selecting a geographical location;
obtaining a database, a bottom composition database and a sound speed profile database for said selected geographical location;
calculating a bottom-loss-and-scattering corrected-for-slope for said geographical location using said bottom composition database and said bathymetry database; and
calculating a deterministic component of surface reverberation using said bottom-loss and scattering corrected for slope and said sound speed profile database by modeling an acoustic signal propagating from said acoustic transmitter to said acoustic receiver using a normal mode model.

12. The apparatus of claim 11 wherein said computer is further configured to be capable of enhancing the spatial resolution of said bathymetry using fractal interpolation to provide an enhanced bathymetry; characterizing said enhanced bathymetry to produce surface-roughness wave-numbers, and wherein said calculating a deterministic component of surface reverberation further comprises using said surface roughness wave-numbers.

13. The apparatus of claim 11 wherein said computer is further configured to be capable of obtaining a Generalized Gamma distribution database; and calculating a stochastic realization of clutter using said Generalized Gamma distribution database by modeling an acoustic signal propagating from said acoustic transmitter to said acoustic receiver using a normal mode model.

14. The apparatus of claim 13 wherein said Generalized Gamma distribution database comprises parameters alpha, beta and c that provide a best fit of equation $$f(x) = \frac{|c|}{x}\left(\frac{x}{\beta}\right)^{ac} \exp[-(x/\beta)^c]/\Gamma(\alpha)$$

to experimental data from said selected bathymetry or to a bathymetry analogous to said selected bathymetry, where f(x) represents a probability of a false alarm, x represents a strength of a return signal relative to a detection threshold of said active sonar, alpha, beta and c are numeric constants and $\Gamma(\alpha)$ is the Gamma function which is related to the factorial function by $\Gamma(\alpha)=(\alpha-1)!$.

15. A device for predicting an active sonar array's performance, comprising:
means for specifying an acoustic transmitter and an acoustic receiver of said active sonar array;
means for selecting a geographical location;
means for obtaining a bathymetry, database a bottom composition database and a sound speed profile database for said selected geographical location;
means for calculating a bottom-loss-and-scattering corrected-for-slope for said geographical location using said bottom composition database and said bathymetry database; and
means for calculating a deterministic component of surface reverberation using said bottom-loss and scattering corrected for slope and said sound speed profile database by modeling an acoustic signal propagating from said acoustic transmitter to said acoustic receiver using a normal mode model.

16. The device of claim 15 further comprising:
means for enhancing the spatial resolution of said bathymetry using fractal interpolation to provide an enhanced bathymetry; means for characterizing said enhanced bathymetry to produce surface-roughness wave-numbers, and wherein said means for calculating a deterministic component of surface reverberation further comprises using said surface roughness wave-numbers.

17. The device of claim 15 further comprising:
means for obtaining a Generalized Gamma distribution database; and means for calculating a stochastic realization of clutter using said Generalized Gamma distribution database by modeling an acoustic signal propagating from said acoustic transmitter to said acoustic receiver using a normal mode model.

18. The device of claim 17 wherein said Generalized Gamma distribution database comprises parameters alpha, beta and c that provide a best fit of equation $$f(x) = \frac{|c|}{x}\left(\frac{x}{\beta}\right)^{ac} \exp[-(x/\beta)^c]/\Gamma(\alpha)$$

to experimental data from said selected bathymetry or to a bathymetry analogous to said selected bathymetry, where f(x) represents a probability of a false alarm, x represents a strength of a return signal relative to a detection threshold of said active sonar, alpha, beta and c are numeric constants and $\Gamma(\alpha)$ is the Gamma function which is related to the factorial function by $\Gamma(\alpha)=(\alpha-1)!$.

19. A computer-readable medium for predicting an active sonar array's performance, comprising instructions for:
specifying an acoustic transmitter and an acoustic receiver of said active sonar array;
selecting a geographical location;
obtaining a bathymetry database, a bottom composition database and a sound speed profile database for said selected geographical location;
calculating a bottom-loss-and-scattering corrected-for-slope for said geographical location using said bottom composition database and said bathymetry; and
calculating a deterministic component of surface reverberation using said bathymetry, said bottom-loss and scattering corrected for slope and said sound speed profile database by modeling an acoustic signal propagating from said acoustic transmitter to said acoustic receiver using a normal mode model.

20. A computing device for predicting an active sonar array's performance comprising: a computer-readable medium comprising instructions for:

specifying an acoustic transmitter and an acoustic receiver of said active sonar array;

selecting a geographical location;

obtaining a bathymetry database, a bottom composition database and a sound speed profile database for said selected geographical location;

calculating a bottom-loss-and-scattering corrected-for-slope for said geographical location using said bottom composition database and said bathymetry database; and calculating a deterministic component of surface reverberation using said bottom-loss and scattering corrected for slope and said sound speed profile database by modeling an acoustic signal propagating from said acoustic transmitter to said acoustic receiver using a normal mode model.

\* \* \* \* \*

UNITED STATES PATENT AND TRADEMARK OFFICE
CERTIFICATE OF CORRECTION

PATENT NO. : 7,002,877 B2
APPLICATION NO. : 10/980058
DATED : February 21, 2006
INVENTOR(S) : Arvelo et al.

Page 1 of 1

It is certified that error appears in the above-identified patent and that said Letters Patent is hereby corrected as shown below:

On the title page, item (75), line 1, delete "Juan I. Arvelo" and insert therefor -- Juan I. Arvelo, Jr. --.

Col. 8, Claim 1, line 6, delete "bathymetry, database" and insert therefor -- bathymetry database,--.

Col. 9, Claim 11, line 7, delete "a database" and insert therefor -- a bathymetry database--.

Col. 10, Claim 15, line 6, delete "bathymetry, database" and insert therefor -- bathymetry database,--.

Col. 10, Claim 19, line 11, delete "bathometry" and insert therefor -- bathymetry database--.

Col. 10, Claim 19, line 13, delete "said bathometry".

Signed and Sealed this

Eleventh Day of September, 2007

JON W. DUDAS
*Director of the United States Patent and Trademark Office*